No. 734,968. PATENTED JULY 28, 1903.
F. SCHWINGER, Jr.
WHEEL FENDER FOR RAILWAY CARS.
APPLICATION FILED MAR. 2, 1903.
NO MODEL.
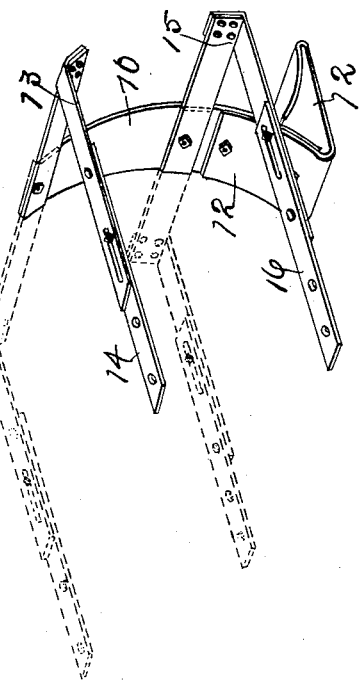
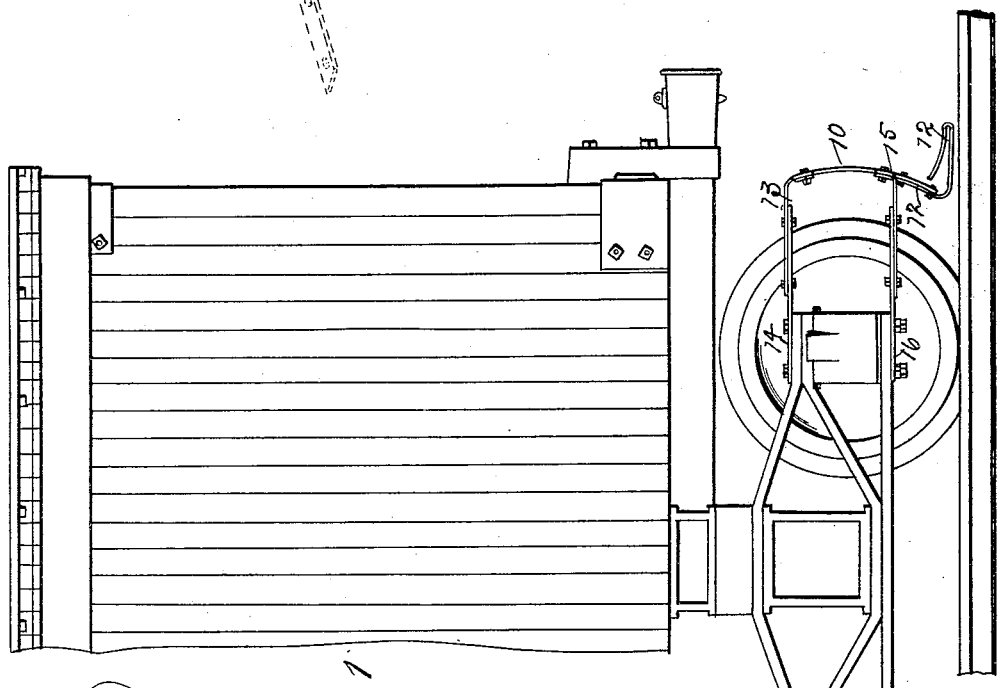

No. 734,968. Patented July 28, 1903.

UNITED STATES PATENT OFFICE.

FRED SCHWINGER, JR., OF ACKLEY, IOWA.

WHEEL-FENDER FOR RAILWAY-CARS.

SPECIFICATION forming part of Letters Patent No. 734,968, dated July 28, 1903.

Application filed March 2, 1903. Serial No. 145,846. (No model.)

*To all whom it may concern:*

Be it known that I, FRED SCHWINGER, Jr., a citizen of the United States, residing at Ackley, in the county of Hardin and State of Iowa, have invented a new and useful Wheel-Fender for Railway-Cars, of which the following is a specification.

My object is to prevent the maiming and killing of persons that fall between cars moving on a track and across the rails, especially box or freight cars, between which there is an open space through which a person may fall from the platform or purposely enter when the train is not in motion and be caught by a sudden and unexpected starting of the cars.

My invention consists in the construction and application of a fender to the wheels of a car, as hereinafter set forth, pointed out in my claims, and illustrated in the accompanying drawings, in which—

Figure 1 is a side elevation of the end portion of a car and shows my invention applied as required for practical use. Fig. 2 is a perspective view that shows the construction of the fender.

The numeral 10 designates a rigid curved plate. A spring-steel plate 12, corresponding in width with the plate 10, is fitted to the lower end of the plate 10, and the two overlying parts of the plates are rigidly fixed together by means of screw-bolts and nuts or in any suitable way. The free end portion of the plate 12 is bent forward and into V shape and adapted to slip under a person's body that may have fallen across a track-rail and to prevent the car-wheel from coming into contact with the body and crushing and mangling it. An elbow-shaped bar 13 is fixed to the top of the plate 10 and provided with an adjustable extension 14, adapted to be fixed to the boxing of a car, and a corresponding elbow-shaped bar 15 is fixed to the central portion of the plate and provided with an adjustable extension 16 by means of screw-bolts and nuts in such a manner that they can be fixed to the boxing of a car-wheel, as shown in Fig. 1, to carry the V-shaped forward extension of the spring-plate 12 in front of the car-wheel as required to serve as a fender.

By detachably fixing the elbow-shaped bars 13 and 15 to the plate 10 their positions relative to the plate may be readily changed, as indicated by dotted lines in Fig. 2, and as required for attachment and use on either side of a car.

Having thus described the purpose of my invention, its construction, and application, the practical operation and utility thereof will be readily understood and appreciated by railroad men and others familiar with the dangers incident to railroad service and the art to which my car-wheel fender pertains.

What I claim as new, and desire to secure by Letters Patent, is—

1. A car-wheel fender consisting of a spring-plate bent into V shape at its lower end to project forward and means for fixing it to the truck of a car, for the purposes stated.

2. A car-wheel fender consisting of a rigid plate, a spring-plate fixed to the lower end of the rigid plate and bent forward into V shape, bars fixed to the rigid plate and adapted to be fixed to the boxing of a car-wheel in the manner set forth for the purposes stated.

3. A car-wheel fender consisting of a rigid plate, a spring-plate fixed to the lower end of the rigid plate and bent forward into V shape, bars fixed to the rigid plate and adapted to be fixed to the boxing of a car-wheel, in combination with a car-wheel to operate in the manner set forth for the purposes stated.

FRED SCHWINGER, JR.

Witnesses:
HERMAN HELD,
PETER HELD.